F. A. DRESSER.
QUARTER CRACK CLAMP SETTING TOOL.
APPLICATION FILED MAR. 29, 1915.
1,163,617.
Patented Dec. 7, 1915.
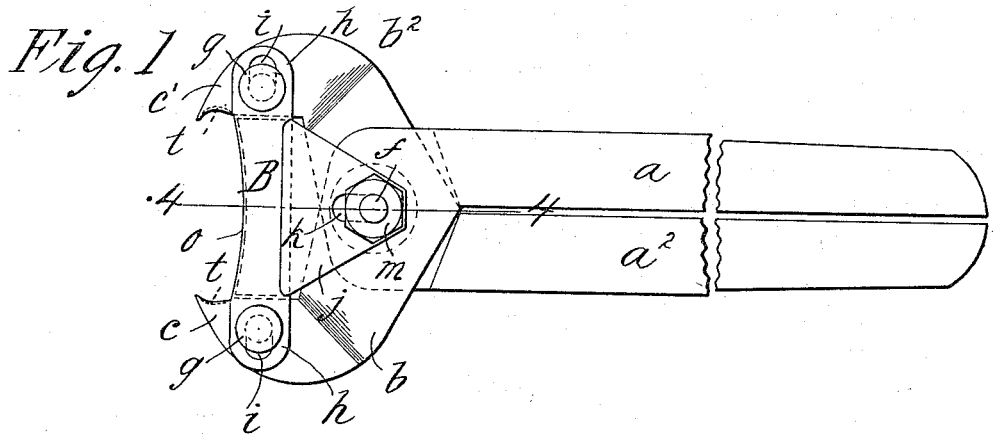
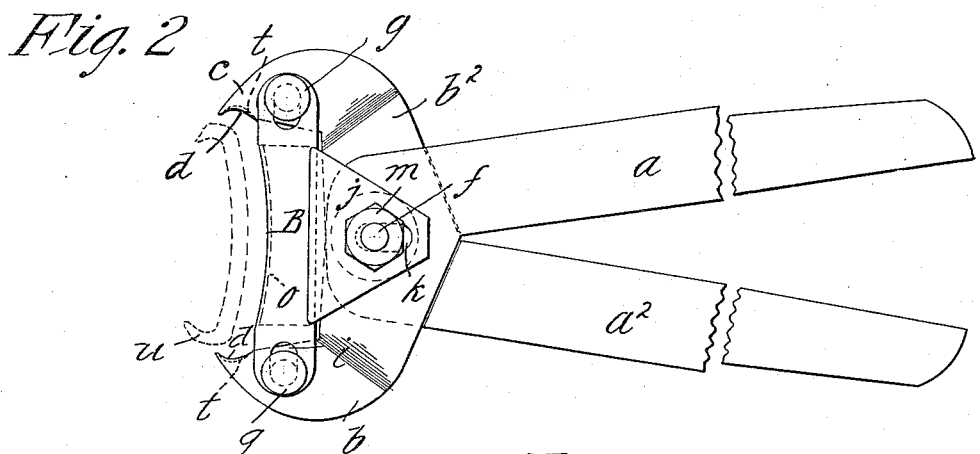
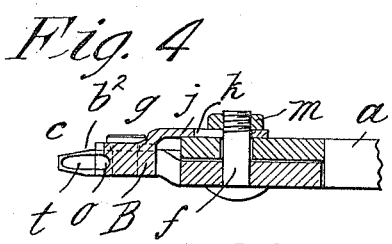
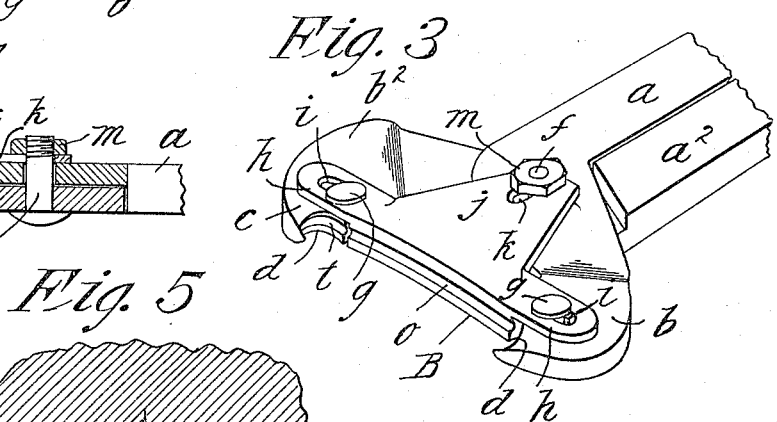
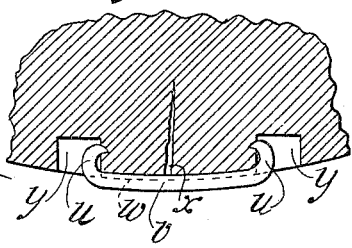
WITNESSES:
G. H. Hayden
B. A. Seaver
INVENTOR.
Frank A. Dresser,
BY
ATTORNEY.
COLUMBIA PLANOGRAPH CO., WASHINGTON, D. C.

UNITED STATES PATENT OFFICE.

FRANK A. DRESSER, OF LYNDONVILLE, VERMONT, ASSIGNOR OF ONE-HALF TO WILMER A. LYON, OF LYNDONVILLE, VERMONT.

QUARTER-CRACK CLAMP-SETTING TOOL.

1,163,617.  Specification of Letters Patent.  Patented Dec. 7, 1915.

Application filed March 29, 1915. Serial No. 17,776.

*To all whom it may concern:*

Be it known that I, FRANK A. DRESSER, a citizen of the United States of America, and resident of Lyndonville, in the county of Caledonia and State of Vermont, have invented certain new and useful Improvements in Quarter - Crack Clamp - Setting Tools, of which the following is a full, clear, and exact description.

This invention relates to a tool or implement for setting clamps or constricting devices in hoofs crosswise of a quarter crack in the hoof.

The invention is described in conjunction with the accompanying drawings, is defined in the appended claims, and the particular objects and advantages of the present improved setting device are hereinafter rendered apparent.

In the drawings:—Figure 1 is a side view of the setting tool showing the parts thereof closed. Fig. 2 is a similar view but showing the tool open. Fig. 3 is a perspective view of the setting tool, the handles thereof being shown as broken off. Fig. 4 is a sectional view taken longitudinally on the plane indicated by line 4—4, Fig. 1. Fig. 5 is a sectional view through a quarter-cracked portion of a hoof in connection with which one of the clamps for rectifying the defective hoof is represented as in its set or engaged position.

For the remedying of the cracked condition of a hoof, by a heated iron a narrow channel $w$ is burned in the hoof on a line transversely of and crossing the crack $x$. This channel at its ends is deepened in the form of holes or cavities $y\ y$ so that shoulders are formed at the ends of the channel by the walls of the cavities $y\ y$ which are toward each other.

The contracting device or "quarter-crack-clamp" is represented by $v$ and consists of a slightly curved bar of heavy wire having rounded hook shaped and pointed extremities $u\ u$. When set in the hoof in a clenched condition, the intermediate part or body of the clamp is partially sunk in the channel across the quarter crack, while the rounded hook shaped ends are forced into the hoof in the portions thereof forming the walls of the cavities which are the nearer to each other.

Now describing the setting tool for the quarter-crack clamps, reference being had to Figs. 1 to 4 of the drawings, a tongs or pincers is provided comprising handle members $a\ a^2$, and jaw members $b,\ b^2$, the jaw members having inturned extremities $c$ and concaved as indicated at $d$ within their points. Said duplicate handle and jaw members are pivoted together by the bolt $f$ in a manner usual in tongs or pincers; but the jaw members $b\ b^2$ are so angularly formed relatively to their handles that when the handles are swung even to their most fully closed relation, there is a comparatively wide separation of the jaws the degree of separation being increased, within comparatively slight limits, however, when the handles are moved apart. The jaws $b,\ b^2$, are provided with studs $g\ g$, made with head enlargements located in opposition and upstanding above the faces of the jaws.

B represents a bar extending across from one to the other of the jaws behind their inturned extremities, the same having its intermediate portion in the plane of the jaws, while its extremities $h\ h$, formed of less thickness than the bar proper have overlapped relations on the jaws and are provided in such extremities with slots $i\ i$, longitudinally alined and in which slots the aforementioned studs $g\ g$ are engaged. The said bar B has a rearwardly extended integrally formed or rigid member $j$ provided with a slot $k$ in its rear portion which is at right angles to the length of the bar proper and to the slots $i\ i$ in the extremities thereof; and the so slotted rear portion of the angular bar extension $j$ engages about the pivot bolt $f$ of the pincers, which bolt is,— to enable such engagement to be made,— extended suitably beyond the pivotally united pincers members to protrude through the slot $k$ and to receive the nut, or head forming portion, $m$. The forward edge of the body portion of the bar B, which portion is as thick or slightly thicker than the extremities $c\ c$ of the jaws is curved corresponding to the arching or curvature of the quartercrack-clamp and it is also grooved as indicated at $o$ to more or less conform to the cross sectional circular contour of the clamp; and the inner edges of the jaw extremities $c$ also have grooves $t$ therein. The engagements between the slotted bar B and its extension $j$ with the studs and bolts of the tongs is such that while the free opening and closing movements of the tongs is permitted without obstruction by the extension-provided bar, the bar is maintained under all positions of the jaws in equal relations to the latter,—that is the bar may not move outwardly relatively to one of the jaws at the expense of having a movement inwardly relatively to the other jaw, whereby the forward grooved edge would be thrown out or shifted from the position in which it is desired to be maintained for its proper action in relation to the quartercrack clamp at the time when the latter is being set to the hoof.

In the use of the tool, the clamp $v$ having been properly placed, the jaws are opened by separating the handles sufficiently, and by their opposite curved and facing edges brought to embracing and engaging relations to the rounded hook ends of the clamp, whereupon on the forcing, with suitable pressure, of the handles together, the jaws, contracting, cause the rounded hook ends of the clamp to be more sharply bent and forced into the hoof while the intermediate portion or body of the clamp is prevented from buckling by having a lengthwise abutment against the forward face of the bar. After the setting of the clamp for as hard a bind by the same relatively to the cracked hoof as expedient, and in due course of time when the crack shall have become more or less nearly closed, the setting tool will be again brought into use for the further contraction of the clamp,—the action being repeated as many time as the nature of the defect requires, and until the same has become entirely remedied.

I claim:—

1. A quarter-crack-clamp setting-tool consisting of a tongs or pincers, comprising pivoted handle members and inturned jaws, a bar extending across from one to the other of the jaws behind their inturned extremities, and engaging means between the bar and tongs for maintaining, under all positions of the jaws, equal relations to said bar with both of the jaws.

2. A quarter-crack-clamp setting-tool consisting of a tongs or pincers, comprising pivoted handle members and inturned jaws, a bar, formed with a curved and grooved forward edge extending across from one to the other of the jaws behind their inturned extremities, and engaging means between the bar and tongs for maintaining, under all positions of the jaws, equal relations of said bar with both of the jaws.

3. A quartercrack-clamp setting-tool, consisting of a tongs or pincers, comprising pivoted handle members and inturned jaws, a bar extending across from one to the other of the jaws behind their inturned extremities, having at its end portions stud and slot engagements with the jaws, and of increased thickness at its intermediate portion between the jaws, and having its forward edge curved, and means for constraining the bar in centralized relations to both jaws under all positions thereof.

4. A quarter-crack-clamp setting-tool consisting of a tongs or pincers comprising pivoted handle members and inturned jaws provided with studs, a bar extending across from one to the other of the jaws behind their inturned extremities, having its intermediate portion in plane with the jaws, and formed with its forward edge curved and grooved and having its extremities in overlapped relations on the jaws, and provided in such extremities with slots longitudinally of the bar engaged with the said studs, and said bar having a rearwardly extended member provided with a slot at right angles to the above named slots, in which latter slot the pivot of the implement is engaged.

5. A quartercrack-clamp setting-tool consisting of a pincers comprising pivotal handle members and inturned jaws, a bar extending across from one to the other of the jaws behind their inturned extremities and located in the plane of the jaws having the forward edge thereof slightly concaved, and the said bar being provided with members extending across the opposite jaws and having stud and slot engagements with the latter.

6. A quartercrack-clamp setting-tool consisting of a pincers comprising pivotal handle members and inturned jaws, a bar extending across from one to the other of the jaws behind their inturned extremities and located in the plane of the jaws having the forward edge thereof slightly concaved and provided with a lengthwise extending groove therein and the said bar being provided with members extending across the opposite jaws and having stud and slot engagements with the latter.

Signed by me at Lyndon in presence of two subscribing witnesses.

FRANK A. DRESSER.

Witnesses:
A. E. HUMPHREY,
N. A. NORTON.